(No Model.)
W. N. CASSON.
HOSE REEL.
No. 517,731. Patented Apr. 3, 1894.
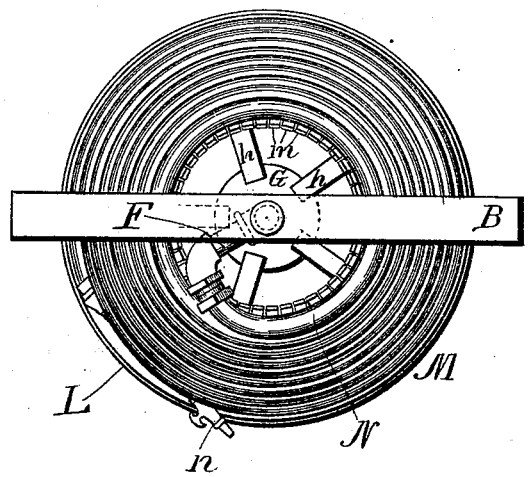
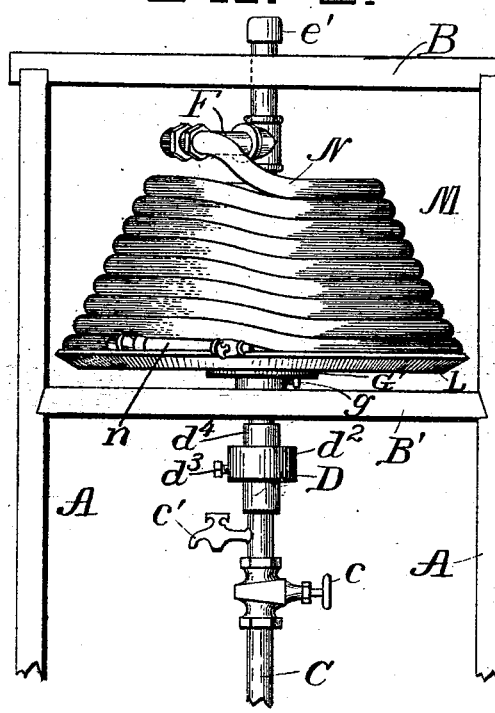
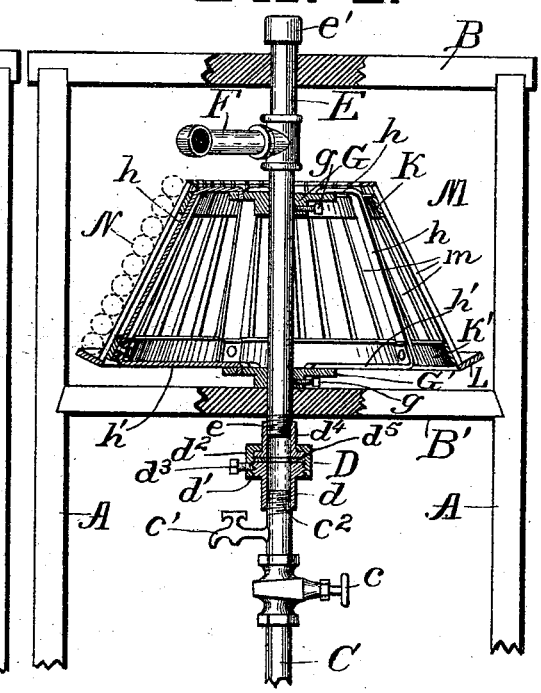
Witnesses
Percy C. Bowen
John C. Wilson
Inventor
William N. Casson
By Whitman & Wilkinson,
Attorneys

UNITED STATES PATENT OFFICE.

WILLIAM N. CASSON, OF MARINETTE, WISCONSIN, ASSIGNOR OF ONE-HALF TO JOHN J. CASSON, OF SAME PLACE.

HOSE-REEL.

SPECIFICATION forming part of Letters Patent No. 517,731, dated April 3, 1894.

Application filed October 7, 1893. Serial No. 487,528. (No model.)

*To all whom it may concern:*

Be it known that I, WILLIAM N. CASSON, a citizen of the United States, residing at Marinette, in the county of Marinette and State of Wisconsin, have invented certain new and useful Improvements in Hose-Reels; and I do hereby declare the following to be a full, clear, and exact description of the invention, such as will enable others skilled in the art to which it appertains to make and use the same.

My invention relates to improvements in apparatus for reeling up and running out hose, and it consists of certain novel features hereinafter described and claimed.

Reference is had to the accompanying drawings, in which the same parts are indicated by the same letters throughout the several views.

Figure 1 represents a plan view of the improved hose reel, with the hose wound thereon, and ready for running out. Fig. 2 represents a side elevation of the hose reel and attachments shown in Fig. 1, and Fig. 3 represents a central vertical section through the hose reel, the hose being removed, and being shown only in dotted lines to the left of the said figure.

A represents a frame work of any desired type and provided with the cross pieces B and B'.

C represents the pipe for supplying the water to the hose, which passes through the floors, or the masonry, not shown, and leads to the revoluble pipe forming the spindle on which the reel is mounted. This pipe C is provided with a stop valve $c$, a drip cock $c'$, and a screw threaded head $c^2$ on to which the part $d$ of the union D is rigidly secured. This part $d$ is screw-threaded as at $d'$ to receive the female screw on the interior of the sleeve $d^2$, which sleeve is rigidly attached to the part $d$ by the set screw $d^3$. The part $d^4$ of the union rests on the packing ring $d^5$ and is screwed to the lower end $e$ of the revoluble pipe E carrying the hose reel. The upper end of this pipe E is closed by a cap $e'$, but a valve or other equivalent device, may be substituted for the cap. Projecting from the pipe E is a branch pipe F to which the hose N is coupled.

The hose reel M is provided with a number of staves $m$ ending at their bottoms in an annular flange L. These staves $m$ and flanges L are secured to the rings K and K' which are attached to the hubs G and G' by means of the bent arms $h$ and $h'$. These hubs G and G' are rigidly attached to the pipe E by means of the set screws G, or they may be rigidly attached thereto in any other convenient way. The slant of the staves $m$ is made sufficiently great to prevent the hose M from slipping down when it is wound around the reel from the top toward the bottom thereof, as shown in Fig. 2. The nozzle $n$ is supported on the shelf or flange L as shown in Fig. 2, when not in use. Ordinarily the valve $c$ and cock $c'$ are kept closed, but when it is desired to pass water through the hose, the valve $c$ is opened, and the water flows up through the pipe E and through the pipe F, and then down through the hose M finding its exit through the nozzle $n$.

It will be obvious that the water will begin to flow and continue flowing through the hose no matter how much the said hose is unwound, and thus it is not necessary to run out the whole length of hose in order to establish a free flow of water. Thus it will be seen that the hose may be rapidly led out to any point within reach of the said hose, and that no more need be led out than the length actually required to reach the desired point. When the water is turned off by means of the valve $c$, the hose will drain itself, like a siphon, if the drain cock $c'$ be opened.

The herein described construction presents a cheap, simple, and effective arrangement for obtaining a stream of water quickly from a fixed pipe.

There may be several tiers of reels either on the same or on separate floors, by connecting with a fixed main or stand pipe running perpendicularly to the upper story of a building, each reel to be independent of the others.

Having thus described my invention, what I claim, and desire to secure by Letters Patent of the United States, is—

1. In an apparatus of the character described, the combination with the fixed pipe C, revoluble pipe E and a union connecting the two; of the branch pipe F; the hose N connected thereto; the conical reel M, rigidly attached to said pipe E; the valve $c$; and the drain cock $c'$, substantially as and for the purposes described.

2. In an apparatus of the character described, the combination with the fixed pipe C, revoluble pipe E, closed as at $e'$, and the union D connecting said fixed pipe and said revoluble pipe; of the branch pipe F; the hose N connected thereto; the hubs G and G' rigidly attached to said revoluble pipe E, and a conical framework mounted upon said hubs, substantially as and for the purposes described.

3. In an apparatus of the character described, the combination with the fixed pipe C, revoluble pipe E, closed as at $e'$ and the union D connecting said fixed pipe and said revoluble pipe; of the branch pipe F; the hose N connected thereto; the hubs G and G' rigidly attached to said revoluble pipe E, the arms $h$ and $h'$; rings K and K'; staves $m$; and annular shelf L, substantially as and for the purposes described.

4. In an apparatus of the character described, the combination with the fixed pipe C, revoluble pipe E, closed as at $e'$ and the union D connecting said fixed pipe and said revoluble pipe; of the branch pipe F; the hose N connected thereto; the hubs G and G' rigidly attached to said revoluble pipe E, the arms $h$ and $h'$; rings K and K'; staves $m$; and annular shelf L; the valve $c$ and drain cock $c'$; substantially as described.

In testimony whereof I affix my signature in presence of two witnesses.

WM. N. CASSON.

Witnesses:
JOHN J. CASSON,
C. E. B. LEWIS.